March 12, 1957 C. F. TEICHMANN 2,785,062
PRODUCTION OF METAL POWDERS FROM THEIR OXIDES
Filed Sept. 13, 1952

INVENTOR.
CHARLES F. TEICHMANN
BY
ATTORNEY

United States Patent Office 2,785,062
Patented Mar. 12, 1957

2,785,062

PRODUCTION OF METAL POWDERS FROM THEIR OXIDES

Charles F. Teichmann, Crestwood, N. Y., assignor to Texaco Development Corporation, New York, N. Y., a corporation of Delaware Application September 13, 1952, Serial No. 309,394

7 Claims. (Cl. 75—.5)

This invention relates to a novel method for preparing metals from their oxides. By this method metal powders can be prepared continuously, rapidly, and economically with average particle sizes smaller than 40 microns and even as small as 1–5 microns or less. It is also possible to prepare liquid metals more rapidly and efficiently than heretofore. Among the metals which can be prepared by my process are those below chromium in the electrochemical series.

In accordance with the principles of the present invention there is provided a novel method for producing a comminuted metal from a readily reducible metal oxide which comprises forming a flowable mixture such as a slurry of particles of the metal oxide in a vaporizable liquid, such as water or kerosene or an oil-water emulsion, for example, and passing the slurry into an elongated tubular heating zone wherein it is heated to a temperature sufficient to evaporate substantially all of the liquid. Particles of metal oxide then are carried by the resulting vapor at high velocity in violently turbulent flow through a succeeding zone in a long tube to disintegrate any solid particles and decrease their size.

Reduction of the oxide to the metal is accomplished by reacting the oxide with a reducing gas such as hydrogen, carbon monoxide, or a hydrocarbon such as methane. The reactions are almost stoichiometric, less than 10 percent excess reducing gas generally sufficing. The reducing gas may be introduced into the long tube to react with the metal oxide while maintaining the high velocity turbulent flow conditions to effect disintegration of particles flowing with the vapor, and while maintaining the temperature below the melting point of the metal, to produce as a product comminuted metal much finer than the particles of metal oxide initially passed into the heating zone. Alternatively, the finely divided metal oxide powder may be separated from the vapor and then reduced in a separate reactor. Liquid metal is obtained when the temperature in the reduction zone is above the melting point.

Figure 1:
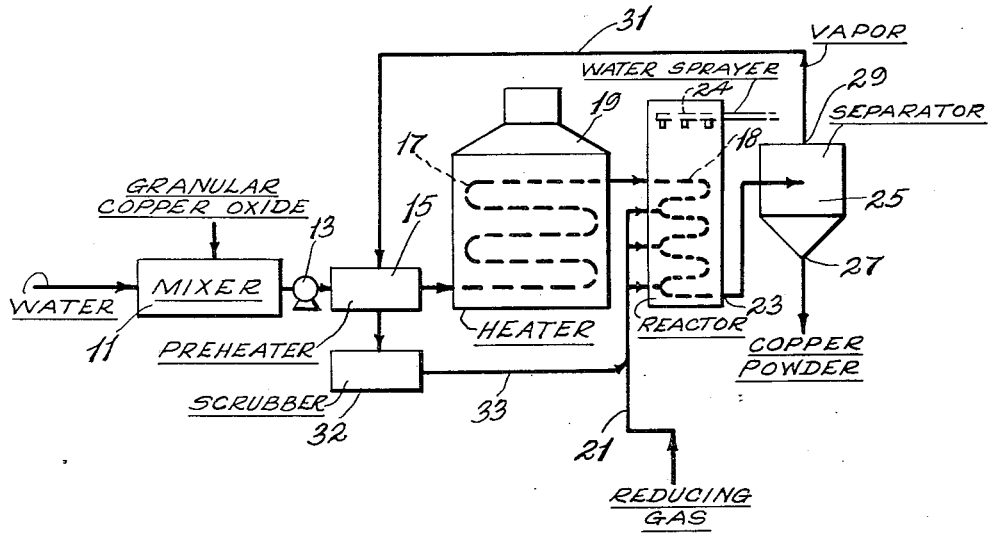
Figure 2:
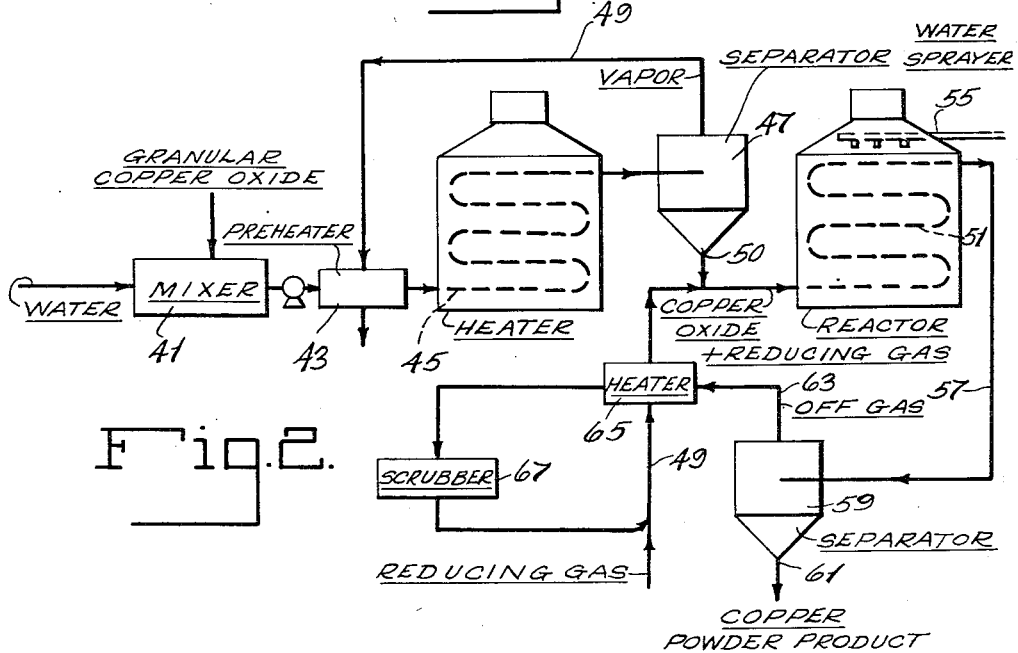

The invention will be described in detail below with reference to the accompanying drawings wherein:

Fig. 1 is a schematic view of one type of apparatus suitable for performing my novel method by both grinding and reducing the metal oxide in the same long tube; and Fig. 2 is a schematic view of apparatus suitable for performing a modified embodiment of my novel method by grinding the metal oxide in a long tube, and then reducing it in a separate reactor.

In performing my novel method particles of metal oxide are introduced into a mixer 11 wherein they are mixed intimately with a vaporizable liquid such as water or kerosene to form a pumpable slurry. The metal oxide particles should be small enough to be handled readily as a suspension or slurry, particles as large as 5 mm. diameter down to .074 mm. or less being satisfactory. Enough liquid should be added to produce a slurry which consists at least 35 percent of liquid by weight. In some instances it may be desirable to mix an inert solid material such as bentonite with the slurry, and a solid reducing material such as carbon can also be added, with or without the inert.

The slurry is transferred by a pump 13, such as a piston type mud pump, through a preheater 15 and into an elongated coiled tube 17 contained within a heater 19, such as a fuel-fired furnace. A tube 17 having an inside diameter of ½ inch and a length of 150 to 1,000 feet can be used. It need not necessarily be coiled for operability of the method, but a coil is advantageous for compactness and heating efficiency.

The initial section of the tube 17 constitutes the heating zone in which the liquid is heated up to its boiling point and the particles of metal oxide are also concurrently heated. Part-way through the tube 17 the boiling temperature is reached and the liquid is converted to a large volume of vapor which flows at a high velocity in an extremely turbulent manner through the tube, carrying particles of disintegrating metal oxide with it. The vapor and metal oxide particles then pass out of tube 17 into a similar coiled long reaction tube 18 having several spaced inlets for reducing gas connected to a supply conduit 21.

The reducing gas immediately starts to react with the particles of metal oxide flowing turbulently at high velocity with the vapor in tube 18 and converts them to metal as they pass through the tube to its outlet 23. Further reduction in particle size occurs in tube 18.

The reducing reaction is sufficiently exothermic with most metal oxides that external heating of the reaction tube 18 usually is unnecessary to maintain high velocity vapor flow. In fact, so much heat energy generally will be liberated that tube 18 should be cooled, as by water jets from a sprayer 24, when an economically high production rate is employed. Cooling can be dispensed with when a sufficiently small throughput of metal oxide is employed, and when the reducing fluid is sufficiently dilute, but a lower production rate is then obtained.

Tubes 17 and 18 actually constitute two parts of a single long tube wherein grinding and reducing occur. It is apparent that both 17 and 18 could be composed of two or more parts, each lying within its own heating furnace or cooling vessel, or they could both be located within the same enclosure.

The extremely high velocity turbulent flow maintained within the tubes 17 and 18 causes the particles of metal oxide, before reduction, and the particles of metal, after reduction, to impinge against one another and disintegrate to powder of greatly decreased size compared to the particles of oxide originally in the slurry.

The vapor and metal powder are discharged from the tube 18 through outlet 23 and flow to a separator 25 such as a conventional cyclone separator wherein the vapor and metal particles are separated from one another, the metal dropping out of suspension and being discharged as a substantially dry powder through the outlet 27, and the vapor (including any excess reducing gas and gaseous products of the reaction) leaving at the top through an outlet 29.

For economy the separated hot vapor is passed by a conduit 31 to slurry preheater 15. Any uncondensed vapor then passes to a scrubber 32 wherein all but the excess reducing gas is removed, after which the excess reducing gas passes by a conduit 33 into the supply conduit 21.

The type of scrubber 32 depends upon the type of reducing gas employed in the operation. When the reducing gas is hydrogen, it is only necessary to condense water vapor. When the reducing fluid is carbon monoxide it is only necessary to absorb carbon dioxide in a caustic solution, or the like. When the reducing fluid is a hydrocarbon, such as methane, provision must be made both for condensing water vapor and for absorbing carbon dioxide.

Further economy can be realized by recycling condensed water to the mixer 11, if desired. Any finely-divided metal carried over with the separated vapor can be filtered or scrubbed out if such recovery is economically justified. Any unconverted metal oxide leaving the separator 25 can be segregated and recycled to the mixer 11.

In carrying out the method described above it is advantageous for the slurry entering the tube 17 to have a linear velocity at least between ½ and 10 feet per second, suitably about 1 foot per second. Efficient grinding of solid material in the tubes 17 and 18 is obtained when the vapor velocity therein is between 100 and 3,000 feet per second, with velocities above 200 feet per second being especially desirable. Higher velocities may be used, and pressures up to 500 pounds per square inch gauge or higher can be used.

The reduction temperatures vary for the different metal oxides, typical examples being set forth below. With copper oxide the reaction with hydrogen will proceed at temperatures above about 140° C.; with carbon monoxide, above about 130° C.; with methane, above about 530° C. Hydrogen also starts to reduce zinc oxide at about 310° C.; lead monoxide at about 185° C.; and cadmium oxide at about 280° C. Iron oxide can be reduced by hydrogen at 500–600° C.; nickel oxide at about 300° C.; cobalt oxide at 500–600° C. (reduction starting at about 165° C.); tin oxide at 700–800° C.; manganese monoxide at about 1,200° C.; but at a considerably lower temperature at high pressures, e. g., 200° C. at 150 atm. Cobalt oxide can be reduced with carbon monoxide at about 600° C. Lead monoxide can be reduced with methane at about 750° C. The reaction temperature actually employed should in every case be high enough to assure the production of sufficient steam or other vapor for grinding. The top temperature should be below the melting point of the metal when metal powder is wanted, since molten metal would be produced above the melting point.

Using the production of finely-divided copper metal from copper oxide particles as an example, the principles of the invention may be applied by first making up a water slurry consisting of about 50 percent by weight of copper oxide particles ranging between .177 and 4.76 mm. in size. This slurry is pumped at a rate of 1,000 pounds per hour into a ½ inch I. D. tube 17 which is 200 feet long and thence into tube 18. Tube 17 is heated to a temperature of about 220° C., and a pressure of about 95 pounds per square inch gauge is maintained at outlet 23. Meanwhile, gaseous hydrogen is pumped into the tube 18, which is 400 feet long, at a rate of 2,500 cubic feet per hour to react exothermically with the hot fine particles of copper oxide and produce an extremely finely-divided copper powder product. Since the reaction is quite exothermic it is important to control the temperature in the tube 18, as by spraying water over the tube from the sprayer 24 to prevent damage to the apparatus.

In the embodiment of the invention illustrated in Fig. 2, the metal oxide is introduced into the system and initially ground in the same manner as described in connection with Fig. 1. However, before the reduction takes place the finely ground metal oxide is separated from the steam or other vapor, after which the reducing gas picks up and fluidizes the powdered copper oxide to carry out the reducing reaction.

More in detail, the metal oxide and liquid are combined to form a slurry in a mixer 41 and the slurry is then passed in high velocity turbulent flow through a preheater 43 and a grinding coil 45 to disintegrate the copper oxide particles, and then into the separator 47. Vapor passes by a conduit 49 to the preheater 43. Hot copper oxide is passed out through a bottom exit 50 and is carried by a reducing gas, such as gaseous hydrogen from a supply conduit 49, into a reactor 51 wherein the reduction takes place. The temperature of the reactants should be at least 140° C. to initiate the reaction. The initial section of reactor 51 can be heated mildly to assure such a temperature. Since the reaction is exothermic the temperature should be controlled in the latter part of the reactor 51, as by spraying water thereon from a water spray device 55.

It is advantageous for the reactor 51 to be a long coiled tube like the tube 18 of Fig. 1, and for the reducing gas to flow in such volume and at such a high rate that a violently turbulent flow occurs which further decreases the size of the particles passing through the tube. However, when no further size reduction is required, the reactor 51 can be a simple chamber.

The reduced metal and accompanying gases pass from reactor 51 by a conduit 57 to a separator 59 from which the metal powder product is discharged through a bottom exit 61, and the gases are discharged at the top through a conduit 63.

The heat of the off-gases in conduit 63 may be utilized by passing them through a hydrogen preheater 65. From there any uncondensed gases flow to a scrubber 67 wherein all but the excess reducing gas is removed. Then the excess reducing gas flows back into the supply conduit 49.

While it is not known for certain just what is the mechanism of the grinding that takes place in tubes 17 and 18, 45 and 51, it is believed that the extremely turbulent flow at high velocity produces innumerable collisions of the solid particles with one another thus causing their disintegration to an extremely fine state such that the average diameter of particles is of the order of 1–5 microns. There also may be some particle size reduction due to the rapid expansion and contraction effects on the particles and the violent transfer of energy to the particles within the heating zone when liquid is vaporized from the particles.

My novel method is particularly advantageous because it will produce the finest metal powder continuously, rapidly, and economically without requiring an independent grinding step. It is also of particular value because water vapor will not accumulate on the particle surface to inhibit the reaction, as in static reduction methods.

The use of a slurry from which liquid is vaporized to carry the solid particles in a fluidized condition through the system is another important advantage over prior procedures involving the fluidizing of solids. In such prior procedures the solid particles must be suspended directly in an expensively compressed gas by complicated apparatus, and a higher ratio of gas to solid is required than in the present invention.

Obviously many modifications and variations of the invention, as hereinbefore set forth, may be made without departing from the spirit and scope thereof, and therefore only such limitations should be imposed as are indicated in the appended claims.

I claim:

1. A method for producing comminuted metal from metal oxide which comprises forming a slurry of particles of said metal oxide in a vaporizable liquid; passing said slurry into a heating zone; heating said slurry to a temperature sufficient to evaporate substantially all of said liquid to vapor; passing said particles of metal oxide with said vapor through a long tube in turbulent flow and at a high velocity sufficient to effect disintegration of particles of said metal oxide flowing with said vapor; discharging said vapor and metal oxide particles from said tube; separating said metal oxide particles from said vapor; and passing said metal oxide particles into a reactor while concurrently passing a reducing gas through said reactor in intimate relation with said metal oxide particles and while maintaining the temperature below the melting point of said metal, to reduce said metal oxide particles to metal powder much finer than the particles of metal oxide in said slurry.

2. A method in accordance with claim 1 also comprising the step of passing said separated vapor in heat exchange relation with said slurry before said slurry enters said heating zone.

3. A method in accordance with claim 1 wherein said reactor is a second long tube, and wherein said metal oxide and said reducing gas flow together in high velocity turbulent flow through said second tube to decrease still further the size of metal particles.

4. A method in accordance with claim 1 also comprising the steps of separating reduced metal particles from the gas leaving said reactor; and recycling excess reducing gas into said reactor.

5. A method in accordance with claim 4 also comprising the step of passing said separated gas in heat exchange relation with the reducing gas entering said reactor.

6. A method in accordance with claim 1 also comprising the steps of separating reduced particles from the gas leaving said reactor; scrubbing said gas to remove therefrom ingredients other than unreacted reducing gas; and recycling the reducing gas so recovered into said reactor.

7. A method for producing comminuted metal from an oxide thereof which comprises forming a flowable mixture of relatively coarse particles of said oxide in a vaporizable liquid; passing said mixture into an elongated tubular heating zone; heating said mixture during passage through said tubular zone to a temperature sufficient to vaporize substantially all of said liquid during passage through said zone, forming therein a dispersion of solid oxide particles in resulting vapor; passing said dispersion through a succeeding zone of high velocity flow while subjecting the flowing stream therein to turbulence and a high velocity sufficient to effect disintegration of said coarse particles of oxide flowing with said vapor; discharging said vapor and said metal oxide particles from said succeeding zone; separating said metal oxide particles from said vapor; and passing said metal oxide particles into a reactor while concurrently passing a reducing gas through said reactor in intimate relation with said metal oxide particles and while maintaining the temperature below the melting point of said metal to reduce said metal oxide particles to a metal powder much finer than the particles of metal oxide in said slurry.

References Cited in the file of this patent

UNITED STATES PATENTS

| | | |
|---|---|---|
| 2,481,226 | Krebs | Sept. 6, 1949 |
| 2,515,542 | Yellot | July 18, 1950 |
| 2,538,201 | Kalbach et al. | Jan. 16, 1951 |
| 2,552,603 | Tanner | May 15, 1951 |
| 2,567,959 | Munday | Sept. 18, 1951 |
| 2,586,818 | Harms | Feb. 26, 1952 |
| 2,669,509 | Sellers | Feb. 16, 1954 |
| 2,677,608 | McKay et al. | May 4, 1954 |

OTHER REFERENCES

"The Canadian Mining and Metallurgical Bulletin" for April 1949, pp. 181, 182.